US012781873B2

(12) United States Patent
Fang et al.

(10) Patent No.: US 12,781,873 B2
(45) **Date of Patent: *Nov. 3, 2026**

(54) VALVE PLATE ELECTRIC LOCKING MECHANISM

(71) Applicant: Zhejiang chuangge technology co., ltd, Shaoxing (CN)

(72) Inventors: Han Fang, Shaoxing (CN); Ning Fang, Shaoxing (CN)

(73) Assignee: Zhejiang chuangge technology co., ltd, Shaoxing (CN)

( * ) Notice: Subject to any disclaimer, the term of this patent is extended or adjusted under 35 U.S.C. 154(b) by 135 days.

This patent is subject to a terminal disclaimer.

(21) Appl. No.: 18/811,702

(22) Filed: Aug. 21, 2024

(65) Prior Publication Data

US 2025/0347356 A1 Nov. 13, 2025

(30) Foreign Application Priority Data

May 7, 2024 (CN) ......................... 202410553949.8

(51) Int. Cl.
*F16K 35/02* (2006.01)

(52) U.S. Cl.
CPC .................................... *F16K 35/02* (2013.01)

(58) Field of Classification Search
CPC ........................................................ F16K 35/02
See application file for complete search history.

(56) References Cited

U.S. PATENT DOCUMENTS

| | | | | | |
|---|---|---|---|---|---|
| 2,597,815 | A * | 5/1952 | Platts | G05D 13/00 91/375 R |
| 2,852,037 | A * | 9/1958 | Downing | F16K 15/03 251/297 |
| 6,283,448 | B1 * | 9/2001 | Denton | F16K 27/0218 251/74 |
| 2025/0347255 | A1 * | 11/2025 | Guo | F02D 41/042 |

* cited by examiner

*Primary Examiner* — Kevin A Lathers

(57) ABSTRACT

A valve plate electric locking mechanism, which comprises a lock rod, a lock head, an elastic return mechanism, a shell and a motor. The lock head comprises a seat body, a pyramid and a positioning bolt; the seat body is hinged in the shell and driven to rotate by the motor; the screw of the positioning bolt is in threaded connection with the pyramid; and the lock rod comprises a base rod part and a base block part; one end of the base rod part is hinged with the shell, and the other end can automatically approach the lock head; the base block part is detachably connected with the base rod part, and the outer wall of the base block part is provided with a block external convex corner to form a step which can be matched with the sharp corner.

19 Claims, 7 Drawing Sheets

VALVE PLATE ELECTRIC LOCKING MECHANISM

CROSS-REFERENCE TO RELATED APPLICATIONS

This application claims priority of Chinese Patent Application No. 202410553949.8, filed on May 7, 2024, the entire contents of which are incorporated herein by reference.

TECHNICAL FIELD

The present application relates to the technical field of locking mechanisms, in particular to the technical field of a valve plate electric locking mechanism.

BACKGROUND

A diesel engine is an engine that burns diesel to obtain energy release, such as a 12-cylinder water-cooled diesel engine disclosed in the present application with a publication number of CN106224094A and a diesel engine disclosed in the present application with publication number of CN116324141B. Diesel engine has the characteristics of large torque, high thermal efficiency and good economic performance, and is usually used in mobile equipment or transportation (such as trucks, wagons, forklifts, cranes, workover equipment, drilling rigs, excavators, portable generators and welding trucks), emergency vehicles (such as fire engines and ambulances) and small processing devices (such as lawn mowers, blowers, generators, compressors, welding machines and pumps).

Common valves in the market usually include valve plates that can control the cutting and opening of diesel engine pipelines and locking mechanisms (built-in lock heads and lock rods) that can lock the position of the valve plates. However, on the one hand, the existing locking mechanism requires high initial installation accuracy of the lock rod and lock head (otherwise, the lock rod and lock head cannot be normally engaged); on the other hand, the lock rod and lock head cannot work normally due to wear after working for a long time, and it is more troublesome and costly to disassemble and replace the lock rod and lock head directly. In addition, the lock rod is usually reset directly by the torsion spring, which is not only inconvenient for later disassembly and replacement, but also leads to the fact that the maintenance personnel cannot directly control and check the lock rod externally, which has certain security risks.

SUMMARY

The object of the present application is to solve the problems in the prior art, and put forward an electric locking mechanism of the valve plate, which can reduce the requirement of installation accuracy and the cost of component disassembly and replacement, and can avoid material waste to a certain extent; and the external adjusting terminal is convenient for maintenance workers to hold and pull and indirectly control the lock rod.

In order to achieve the above object, the present application provides an electric locking mechanism for a valve plate, which includes a lock rod, a lock head, an elastic return mechanism, a shell and a motor, wherein the lock head includes a seat body, a pyramid and a positioning bolt; the seat body is hinged in the shell and is driven by the motor to rotate; one end of the pyramid is provided with a sharp corner, and the other end of the pyramid is inserted into the seat body; a screw of the positioning bolt is in threaded connection with the pyramid after being inserted into the seat body; and the lock rod includes a base rod part and a base block part; one end of the base rod part is hinged with the shell and the other end can automatically approach the lock head under the drive of the elastic return mechanism; the base block part is detachably connected with the base rod part, and an outer wall of the base block part is provided with a block external convex corner and forms a step that can match with the sharp corner.

Preferably, a rod through groove penetrating a top surface and a bottom surface is formed on the base rod part, the base block part is inserted into the rod through groove, and a groove wall of the rod through groove is provided with a plurality of rod guide grooves; the base block part is provided with a plurality of block ribs corresponding to the rod guide grooves one by one.

Preferably, the top surface of the base rod part is provided with a lower rod groove, and a side of the base block part facing away from the block external convex corner is provided with a block screw, and a free end of the block screw is threaded with a block nut after passing through the base rod part along the lower rod groove.

Preferably, a rod bent section bent toward a side away from the lock head is arranged on the base rod part, and the base block part is arranged at the rod bent section.

Preferably, the sharp corner is composed of intersecting cone inclined surfaces and cone cambered surfaces.

Preferably, a cone pin with a cone screw hole is arranged on the pyramid, and a seat socket for inserting the cone pin and a seat long groove penetrating the top surface and the seat socket; the cone screw hole is able to move along the seat long groove during a process in which the cone pin is inserted or pulled out of the seat socket, an inner wall of the seat socket is provided with a plurality of seat guide grooves, and a plurality of cone ribs respectively corresponding to the seat guide grooves one by one are respectively arranged on the cone pin.

Preferably, an anti-jacking mechanism is installed on the seat body, and the anti-jacking mechanism includes an anti-jacking support block, an anti-jacking bolt and an anti-jacking plate; the anti-jacking support block is fixed on a top surface of the seat body, a screw of the anti-jacking bolt is connected with the anti-jacking plate after being screwed through the anti-jacking support block, and the anti-jacking plate is arranged opposite to a screw head of the positioning bolt.

Preferably, the shell includes a shell body and a shell cover, and the elastic return mechanism includes a stem, a backing plate, a return spring and an adjusting terminal; one end of the stem is screwed into the backing plate, while the other end is screwed through the adjusting terminal after passing through the base rod part, the return spring and the shell body successively; the return spring has an elastic tendency of elongation, and one end of the return spring clamps the lock rod together with the backing plate and the other end clamps the shell body together with the adjusting terminal, and a top opening of the shell body is closed by the shell cover.

Preferably, the base rod part and the shell body are respectively provided with a rod bump and a body bump which can jointly support the backing plate from both sides.

Preferably, the elastic return mechanism further includes an anti-rotation terminal, which is in threaded connection with the stem and located at a side of the adjusting terminal far away from the return spring; adjacent surfaces of the adjusting terminal and the anti-rotation terminal are respectively provided with adjusting teeth and rotation-stopping teeth, and the adjusting teeth and the rotation-stopping teeth can be meshed with each other to restrict the adjusting terminal or the anti-rotation terminal from being screwed out of the stem independently.

The present application has the following beneficial effects:

1) The base rod part and the base block part which are detachably connected together are combined to form a lock rod, at the same time, the outer wall of the base block part is provided with a block body convex corner and a step which can be matched with the lock head is formed, and when the step cannot be matched with the lock head due to installation accuracy or wear, users can select and disassemble the base block part with block body convex corner with different sizes or shapes, thus reducing the initial installation accuracy requirement and the component disassembly and replacement cost, and avoiding material waste to a certain extent, which is more green and environmentally friendly.
2) By arranging a rod through groove penetrating the top and bottom surfaces on the base rod part, adding a plurality of rod guide grooves at the groove wall of the rod through groove, and providing a plurality of matching block ribs outside the base block part, the connection between the base rod part and the base block part can be completed by direct insertion, and the operation is very convenient and smooth.
3) By adding a rod body lower groove on the top surface of the base rod part and allowing the block body screw of the base block part to pass through, the base rod part and the base block part can be locked by using the block nut screwed outside the block screw.
4) One end of the pyramid is provided with a sharp corner and the other end is provided with a cone pin with a cone screw hole, and a seat socket for inserting the cone pin and a seat long groove penetrating the top surface and the seat socket are added on the seat body, so that the depth of inserting the cone pin into the seat socket can be freely controlled according to needs, and the position of the seat body and the pyramid can be fixed by using positioning bolts, so that the extension length of the sharp corner can be adjusted; on the one hand, the initial installation accuracy requirement can be reduced, and on the other hand, only the pyramid can be replaced to reduce maintenance when the sharp corner is worn.
5) By using the intersecting cone inclined plane and cone cambered surface to form a sharp corner, the sharp corner can slide into the step of the lock rod more easily by using the cone cambered surface, and the sharp corner can stably abut against the step by using the cone inclined plane.
6) By installing an anti-jacking mechanism consisting of an anti-jacking support block, an anti-jacking bolt and an anti-jacking plate at the top of the seat body, the anti-jacking bolt can be twisted until the anti-jacking plate abuts against the screw head of the positioning bolt, thus preventing the cone pin from being further inserted into the socket of the seat body due to the jacking action between the sharp corner and the step.
7) By screwing one end of the stem with the backing plate located inside the shell, the other end of the stem is threaded through the adjusting terminal located outside the shell, and the return spring is sleeved outside the stem, so that the length of the stem into which the adjusting terminal is screwed can be controlled according to the sizes of the shell and the lock rod until the return spring with an elongated elastic tendency can be matched with the backing plate and the adjusting terminal respectively to clamp the lock rod and the shell and replace the torsion spring to realize the return of the lock rod, and the external adjusting terminal is convenient for maintenance workers to hold and pull and indirectly control the lock rod.
8) By connecting the anti-rotation terminal located at the side of the adjusting terminal far away from the return spring to the external thread of the stem, and respectively adding the adjusting teeth and the anti-rotation teeth at the adjacent surfaces of the adjusting terminal and the anti-rotation terminal, the engagement between the adjusting teeth and the anti-rotation teeth can be utilized to prevent the adjusting terminal or the anti-rotation terminal from actively coming out of the stem due to vibration and other reasons.

The features and advantages of the present application will be described in detail by examples with the accompanying drawings.

Figure 1:
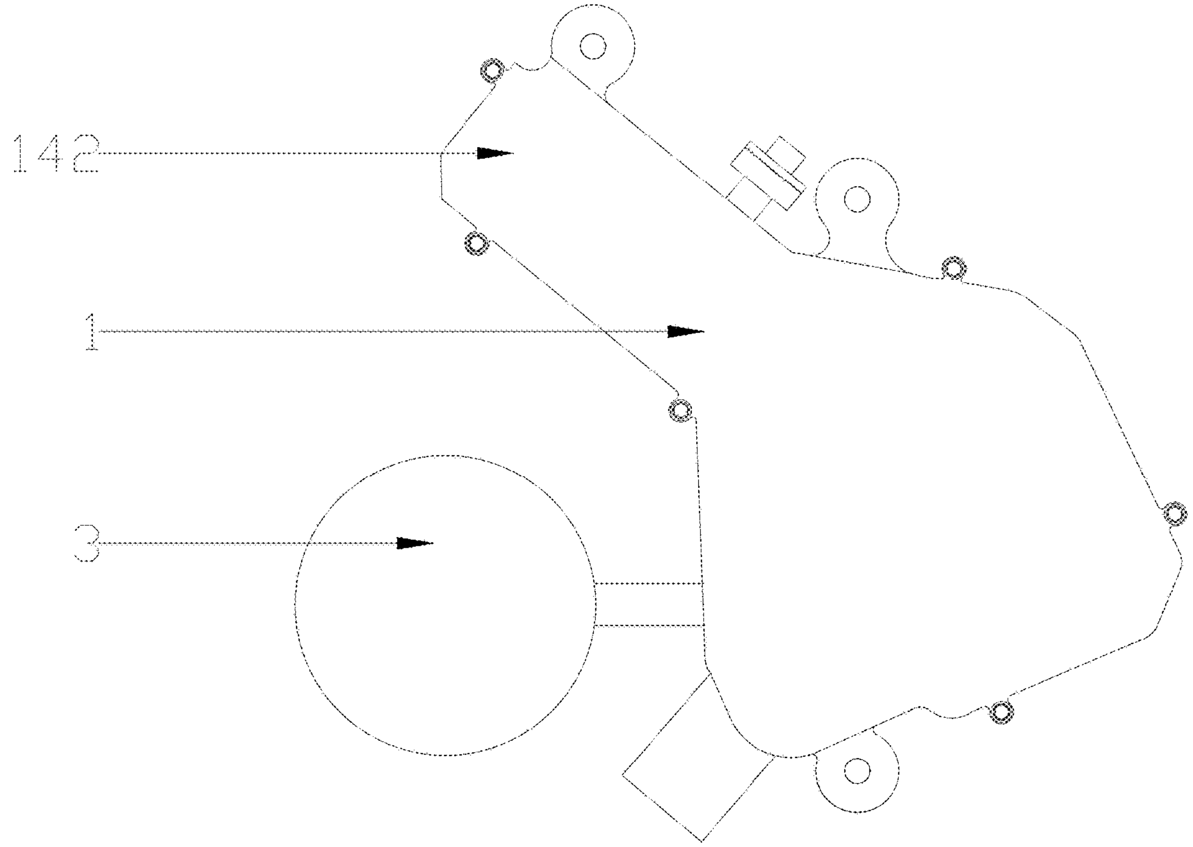
FIG. 1 is a top view of the valve plate electric locking mechanism of the present application when assembled with the valve plate.
Figure 2:
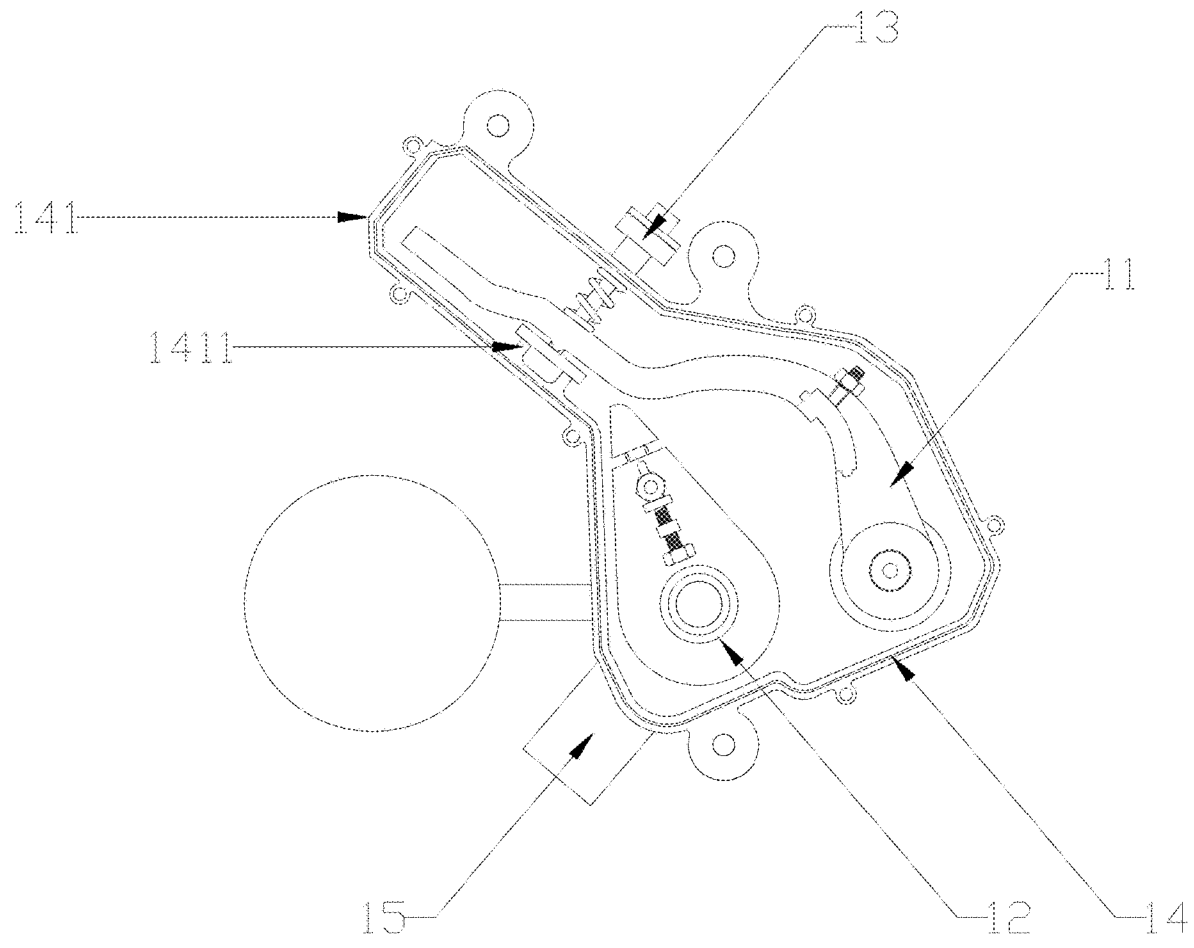
FIG. 2 is a top view of FIG. 1 with the shell cover removed.
Figure 3:
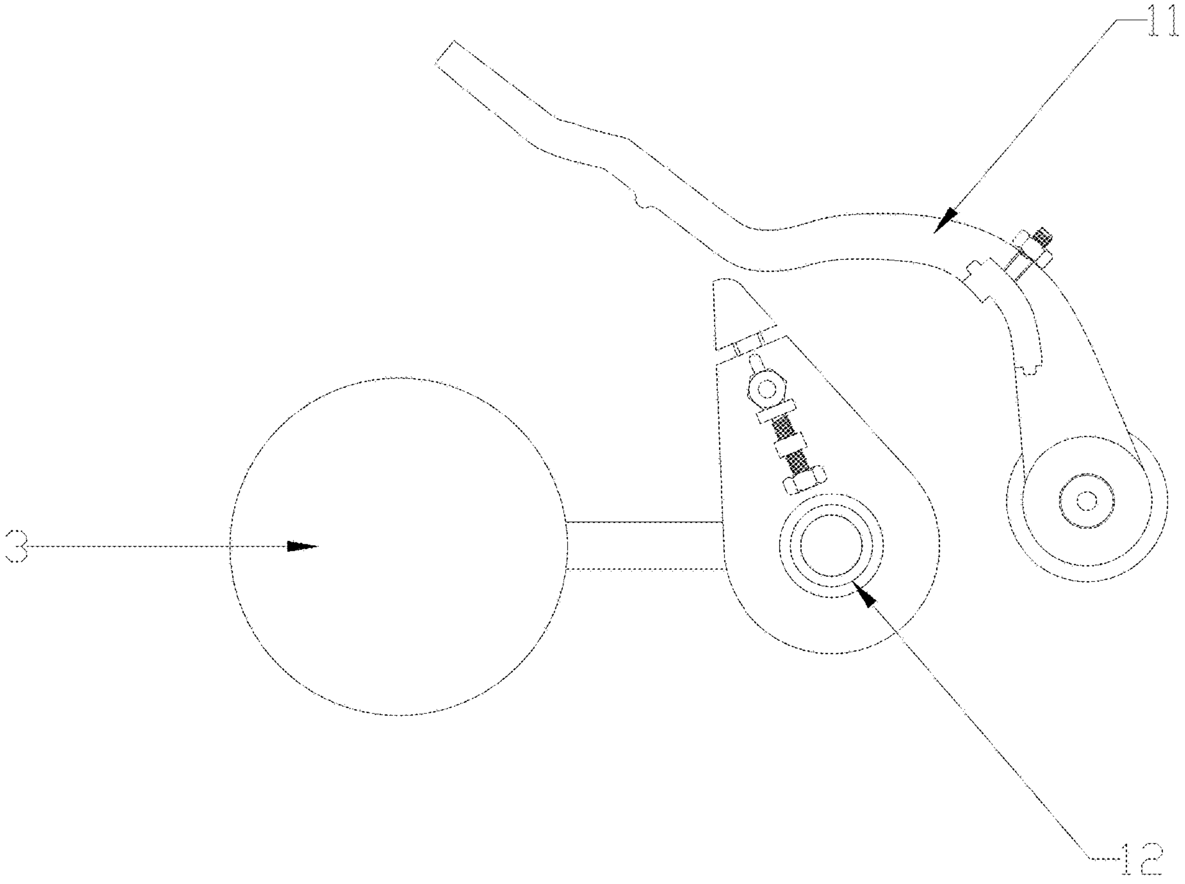
FIG. 3 is a top view of the valve plate electric locking mechanism of the present application when the lock rod and the lock head are not locked.

In the figures: 1—Valve plate electric locking mechanism, 11—Lock rod, 111—Base rod part, 1111—Rod through groove, 1112—Rod guide groove, 1113—Rod lower groove, 1114—Rod bump, 1115—Rod bent section, 112—Base block part, 1121—Block external convex corner, 1122—Block convex edge, 1123—Block screw, 12—Lock head, 121—Seat body, 1211—seat socket, 1212—Seat long groove, 1213—Seat guide groove, 122—Pyramid, 1221—Cone inclined plane, 1222—Cone cambered surface, 1223—Cone pin, 1224—Cone screw hole, 1225—Cone rib, 123—Positioning bolt, 124—Anti-jacking mechanism, 1241—Anti-jacking support block, 1242—Anti-jacking bolt, 1243—Anti-jacking plate, 13—Elastic return mechanism, 131—Stem, 132—Backing plate, 133—Return spring, 134—Adjusting terminal, 1341—Adjusting tooth, 135—Anti-rotation terminal, 1351—Anti-rotation tooth, 14—Shell, 141—Shell body, 1411—Body bump, 142—Shell cover, 15—Motor and 3—Valve plate.

DESCRIPTION OF EMBODIMENTS

Referring to FIG. 1 to FIG. 8, the valve plate electric locking mechanism of the present application includes a lock rod 11, a lock head 12, an elastic return mechanism 13, a shell 14 and a motor 15, wherein the lock head 12 includes a seat body 121, a pyramid 122 and a positioning bolt 123; the seat body 121 is hinged in the shell 14 and is driven by the motor 15 to rotate; one end of the pyramid 122 is provided with a sharp corner, and the other end of the pyramid 122 is inserted into the seat body 121; a screw of the positioning bolt 123 is in threaded connection with the pyramid 122 after being inserted into the seat body 121; and the lock rod 11 includes a base rod part 111 and a base block part 112; one end of the base rod part 111 is hinged with the shell 14 and the other end can automatically approach the lock head 12 under the drive of the elastic return mechanism 13; the base block part 112 is detachably connected with the base rod part 111, and an outer wall of the base block part 112 is provided with a block external convex corner 1121 and forms a step that can match with the sharp corner.

A rod through groove 1111 penetrating a top surface and a bottom surface is formed on the base rod part 111, the base block part 112 is inserted into the rod through groove 1111, and a groove wall of the rod through groove 1111 is provided with a plurality of rod guide grooves 1112; the base block part 112 is provided with a plurality of block ribs 1122 corresponding to the rod guide grooves 1112 one by one.

The base rod part 111 is provided with a rod body through groove 1111 penetrating the top and bottom surfaces, and the base block part 112 is inserted into the rod body through groove 1111. The groove wall of the rod body through groove 1111 is provided with a plurality of rod body guide grooves 1112, and the base block part 112 is provided with a plurality of block ribs 1122 corresponding to each rod body guide groove 1112 respectively.

The top surface of the base rod part 111 is provided with a lower rod groove 1113, and a side of the base block part 112 facing away from the block external convex corner 1121 is provided with a block screw 1123, and a free end of the block screw 1123 is threaded with a block nut after passing through the base rod part 111 along the lower rod groove 1113.

A rod bent section 1115 bent toward a side away from the lock head 12 is arranged on the base rod part 111, and the base block part 112 is arranged at the rod bent section 1115.

The sharp corner is composed of intersecting cone inclined surfaces 1221 and cone cambered surfaces 1222.

A cone pin 1223 with a cone screw hole 1224 is arranged on the pyramid 122, and a seat socket 1211 for inserting the cone pin 1223 and a seat long groove 1212 penetrating the top surface and the seat socket 1211; the cone screw hole 1224 is able to move along the seat long groove 1212 during a process in which the cone pin 1223 is inserted or pulled out of the seat socket 1211, an inner wall of the seat socket 1211 is provided with a plurality of seat guide grooves 1213, and a plurality of cone ribs 1225 respectively corresponding to the seat guide grooves 1213 one by one are respectively arranged on the cone pin 1223.

An anti-jacking mechanism 124 is installed on the seat body 121, and the anti-jacking mechanism 124 includes an anti-jacking support block 1241, an anti-jacking bolt 1242 and an anti-jacking plate 1243; the anti-jacking support block 1241 is fixed on a top surface of the seat body 121, a screw of the anti-jacking bolt 1242 is connected with the anti-jacking plate 1243 after being screwed through the anti-jacking support block 1241, and the anti-jacking plate 1243 is arranged opposite to a screw head of the positioning bolt 123.

The shell 14 includes a shell body 141 and a shell cover 142, and the elastic return mechanism 13 includes a stem 131, a backing plate 132, a return spring 133 and an adjusting terminal 134; one end of the stem 131 is screwed into the backing plate 132, while the other end is screwed through the adjusting terminal 134 after passing through the base rod part 111, the return spring 133 and the shell body 141 successively; the return spring 133 has an elastic tendency of elongation, and one end of the return spring 133 clamps the lock rod 11 together with the backing plate 132 and the other end clamps the shell body 141 together with the adjusting terminal 134, and a top opening of the shell body 141 is closed by the shell cover 142.

The base rod part 111 and the shell body 141 are respectively provided with a rod bump 1114 and a body bump 1411 which can jointly support the backing plate 132 from both sides.

The elastic return mechanism 13 further includes an anti-rotation terminal 135, which is in threaded connection with the stem 131 and located at a side of the adjusting terminal 134 far away from the return spring 133; adjacent surfaces of the adjusting terminal 134 and the anti-rotation terminal 135 are respectively provided with adjusting teeth 1341 and rotation-stopping teeth 1351, and the adjusting teeth 1341 and the rotation-stopping teeth 1351 can be meshed with each other to restrict the adjusting terminal 134 or the anti-rotation terminal 135 from being screwed out of the stem 131 independently.

The work process of that application is as follows:

For the lock rod 11, first, the base block part 112 is inserted into the base rod 111 along the rod through groove 1111, and at the same time, the block screw 1123 is allowed to penetrate through the base rod 111 along the rod lower groove 1113. The rod guide groove 1112 and the block rib 1122 guide the insertion of the base block part 112. Next, a block nut is screwed on the block screw 1123 until the block nut is closely attached to the base rod part 111.

For the lock head 12, firstly, the insertion depth of the cone pin 1223 into the seat socket 1211 is adjusted as needed. The seat guide groove 1213 and the cone rib 1225 guide the insertion of the cone pin 1223. Next, the screw bottom of the positioning bolt 123 is inserted into the seat body 121 along the seat body long groove 1212, and then screwed into the cone screw hole 1224. Finally, the anti-jacking bolt 1242 is twisted until the anti-jacking piece 1243 supports the screw head of the positioning bolt 123.

For the elastic return mechanism 13, the backing plate 132 and the return spring 133 are respectively placed in the inner cavity of the shell 14. Next, one end of the stem 131 passes through the shell 14, the return spring 133 and the lock rod 11 in turn, and then is screwed into the interior of the backing plate 132, and then an adjusting terminal 134 and an anti-rotation terminal 135 are screwed on one end of the stem 131 exposed outside the shell 14 in turn.

Figure 4:
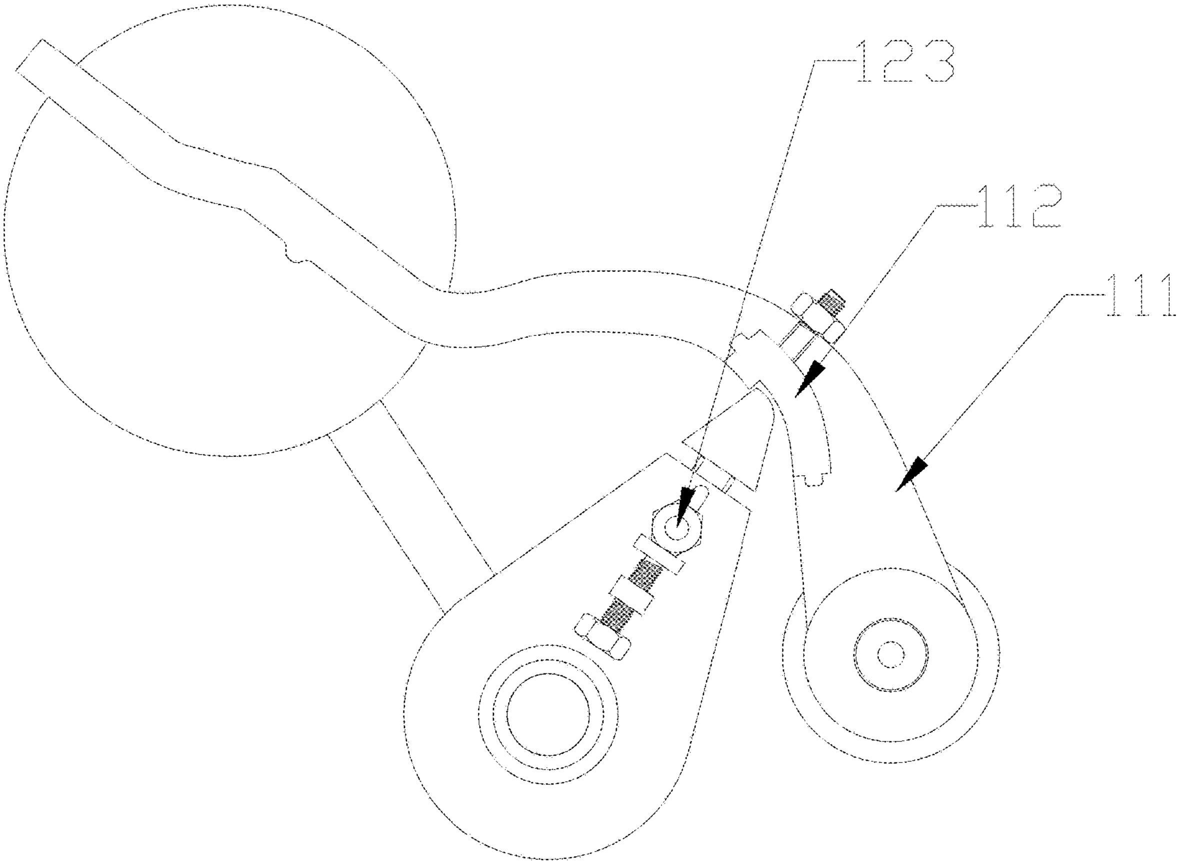
FIG. 4 is a top view of the valve plate electric locking mechanism of the present application when the lock rod and the lock head are locked.
Figure 5:
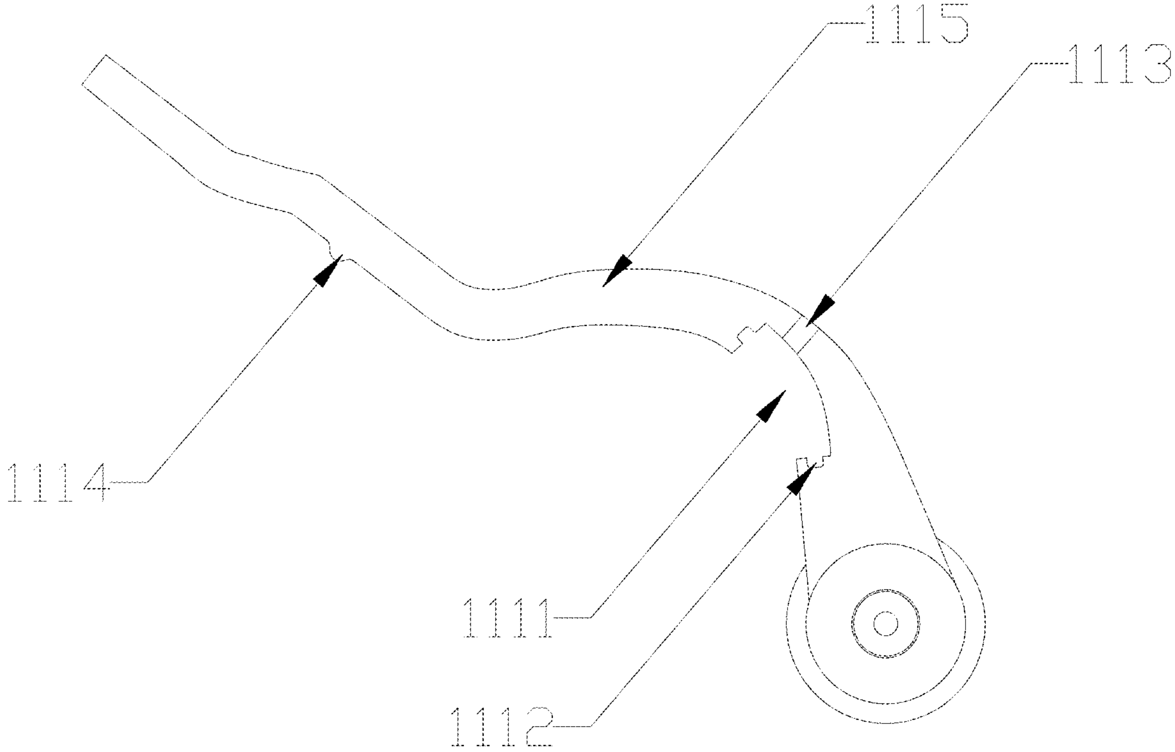
FIG. 5 is a plan view of the base rod part of the valve plate electric locking mechanism of the present application.
Figure 6:
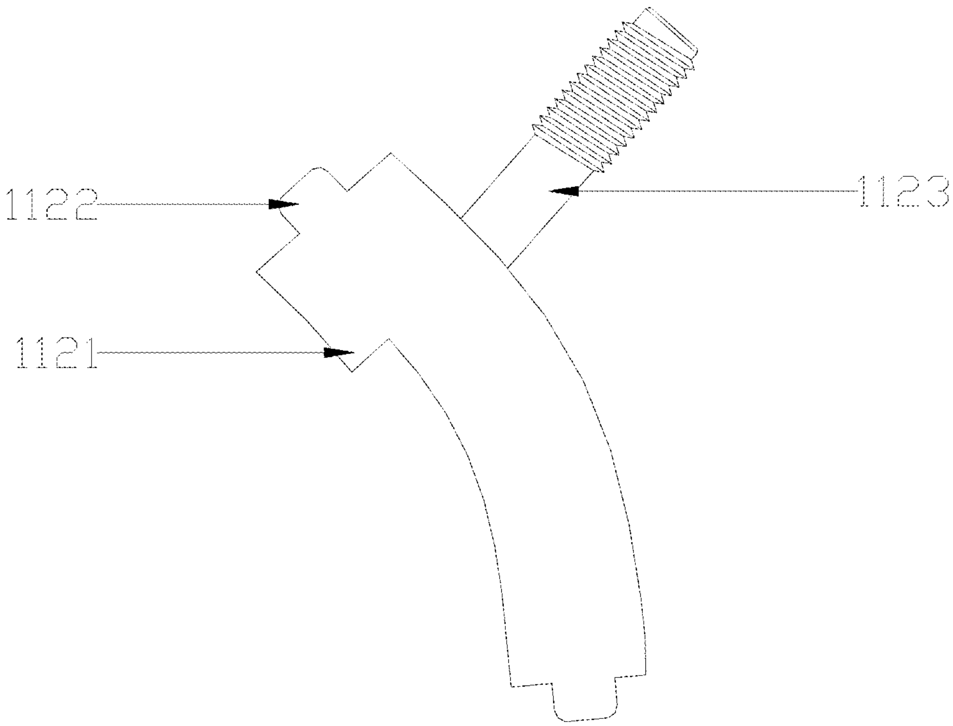
FIG. 6 is a plan view of the base block part of the valve plate electric locking mechanism of the present application.
Figure 7:
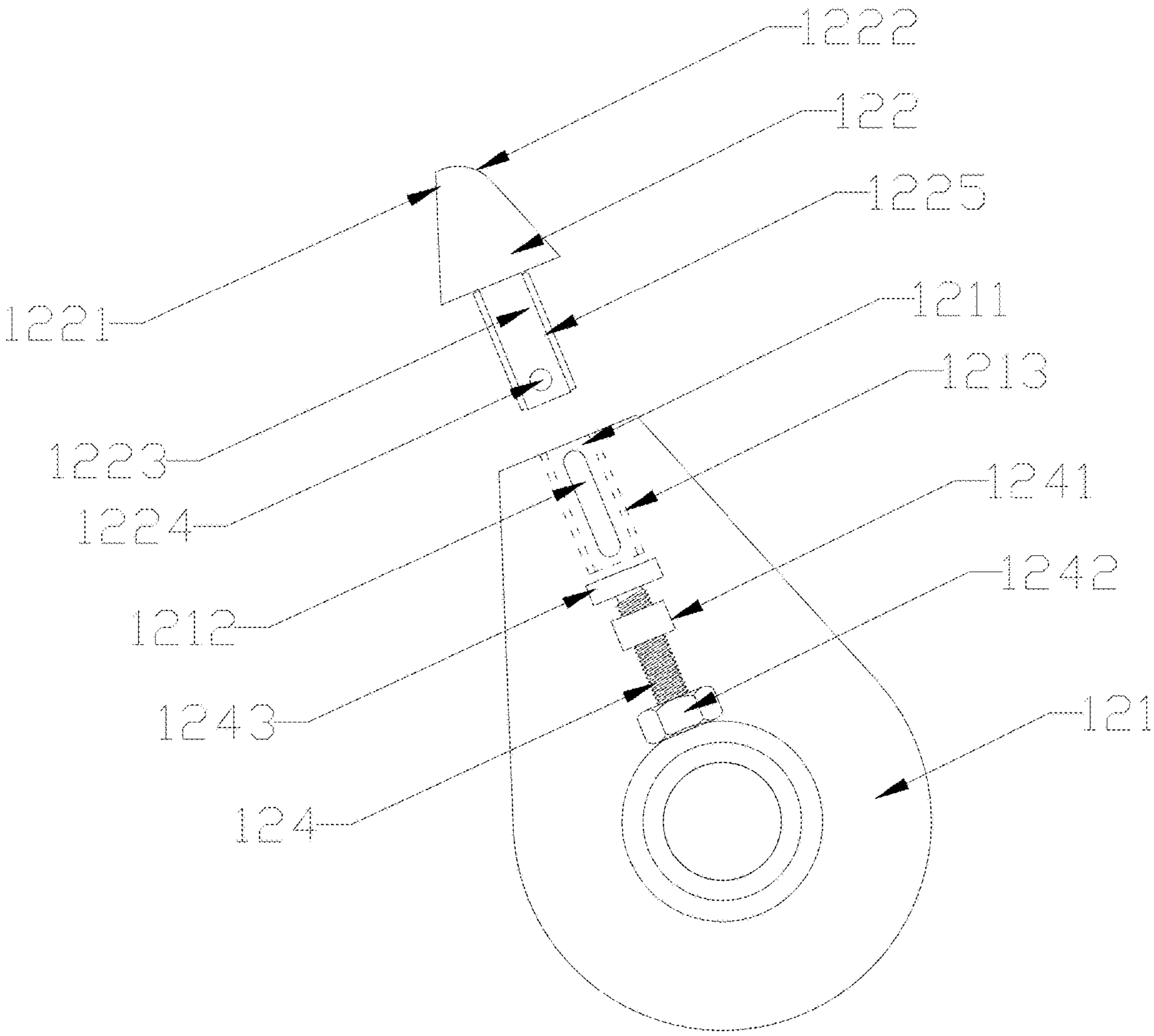
FIG. 7 is an explosion schematic diagram of the lock head of the valve plate electric locking mechanism of the present application when the positioning bolt is removed.
Figure 8:
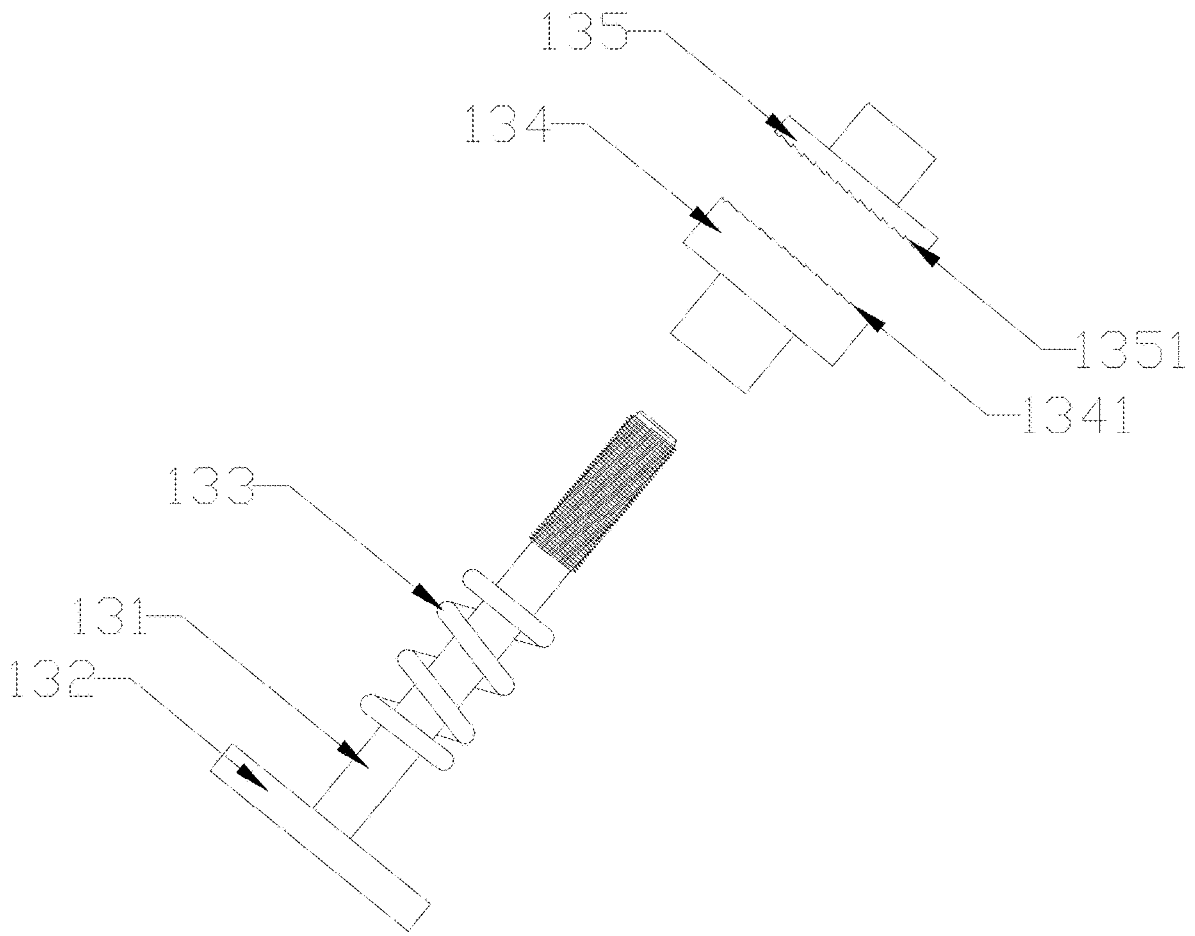
FIG. 8 is an explosion schematic diagram of the elastic return mechanism of the valve plate electric locking mechanism of the present application.

During use, because one end of the lock rod 11 is rotatably connected in the shell 14, and the other end is provided with the elastic return mechanism 13 (the return spring 133 can replace the torsion spring to give the lock rod 11 the force of counterclockwise rotation and realize the return function), the lock head 12 (linked with the valve plate 3) can cooperate with the lock rod 11 and lock the position of the valve plate 3 together when it is driven by the motor 15 to rotate to a sharp corner against the step (see FIG. 4).

In addition, if the step cannot work with the lock head 12 due to installation accuracy or wear, the user can choose the base block part 112 with the block external convex corner 1121 with different sizes or shapes and replace it; if the sharp corner is worn, the pyramid 122 can be directly replaced; if maintenance is needed, the maintenance personnel can also directly hold and pull the adjusting terminal 134 and the anti-rotation terminal 135 outside the shell 14 to drive the lock rod 11 to move and complete the functions such as unlocking between the lock rod 11 and the lock head.

The above embodiment is an illustration of the present application, not a limitation of the present application, and any solution after simple transformation of the present application shall belong to the protection scope of the present application.

The invention claimed is:

1. A valve plate electric locking mechanism, comprising a lock rod (11), a lock head (12), an elastic return mechanism (13), a shell (14) and a motor (15), wherein the lock head (12) comprises a seat body (121), a pyramid (122) and a positioning bolt (123); the seat body (121) is hinged in the shell (14) and is driven by the motor (15) to rotate; one end of the pyramid (122) is provided with a sharp corner, and the other end of the pyramid (122) is inserted into the seat body (121); a screw of the positioning bolt (123) is in threaded connection with the pyramid (122) after being inserted into the seat body (121); and the lock rod (11) comprises a base rod part (111) and a base block part (112); one end of the base rod part (111) is hinged with the shell (14) and the other end can automatically approach the lock head (12) under the drive of the elastic return mechanism (13); the base block part (112) is detachably connected with the base rod part (111), and an outer wall of the base block part (112) is provided with a block external convex corner (1121) and forms a step that can match with the sharp corner;

wherein an anti-jacking mechanism (124) is installed on the seat body (121), and the anti-jacking mechanism (124) comprises an anti-jacking support block (1241), an anti-jacking bolt (1242) and an anti-jacking plate (1243); the anti-jacking support block (1241) is fixed on a top surface of the seat body (121), a screw of the anti-jacking bolt (1242) is connected with the anti-jacking plate (1243) after being screwed through the anti-jacking support block (1241), and the anti-jacking plate (1243) is arranged opposite to a screw head of the positioning bolt (123).

2. The valve plate electric locking mechanism according to claim 1, wherein a rod through groove (1111) penetrating a top surface and a bottom surface is formed on the base rod part (111), the base block part (112) is inserted into the rod through groove (1111), and a groove wall of the rod through groove (1111) is provided with a plurality of rod guide grooves (1112); the base block part (112) is provided with a plurality of block ribs (1122) corresponding to the rod guide grooves (1112) one by one.

3. The valve plate electric locking mechanism according to claim 2 wherein the shell (14) comprises a shell body (141) and a shell cover (142), and the elastic return mechanism (13) comprises a stem (131), a backing plate (132), a return spring (133) and an adjusting terminal (134); one end of the stem (131) is screwed into the backing plate (132), while the other end is screwed through the adjusting terminal (134) after passing through the base rod part (111), the return spring (133) and the shell body (141) successively; the return spring (133) has an elastic tendency of elongation, and one end of the return spring (133) clamps the lock rod (11) together with the backing plate (132) and the other end clamps the shell body (141) together with the adjusting terminal (134), and a top opening of the shell body (141) is closed by the shell cover (142).

4. The valve plate electric locking mechanism according to claim 3, wherein the base rod part (111) and the shell body (141) are respectively provided with a rod bump (1114) and a body bump (1411) which can jointly support the backing plate (132) from both sides.

5. The valve plate electric locking mechanism according to claim 1, wherein the top surface of the base rod part (111) is provided with a lower rod groove (1113), and a side of the base block part (112) facing away from the block external convex corner (1121) is provided with a block screw (1123), and a free end of the block screw (1123) is threaded with a block nut after passing through the base rod part (111) along the lower rod groove (1113).

6. The valve plate electric locking mechanism according to claim 5 wherein the shell (14) comprises a shell body (141) and a shell cover (142), and the elastic return mechanism (13) comprises a stem (131), a backing plate (132), a return spring (133) and an adjusting terminal (134); one end of the stem (131) is screwed into the backing plate (132), while the other end is screwed through the adjusting terminal (134) after passing through the base rod part (111), the return spring (133) and the shell body (141) successively; the return spring (133) has an elastic tendency of elongation, and one end of the return spring (133) clamps the lock rod (11) together with the backing plate (132) and the other end clamps the shell body (141) together with the adjusting terminal (134), and a top opening of the shell body (141) is closed by the shell cover (142).

7. The valve plate electric locking mechanism according to claim 6, wherein the base rod part (111) and the shell body (141) are respectively provided with a rod bump (1114) and a body bump (1411) which can jointly support the backing plate (132) from both sides.

8. The valve plate electric locking mechanism according to claim 1, wherein a rod bent section (1115) bent toward a side away from the lock head (12) is arranged on the base rod part (111), and the base block part (112) is arranged at the rod bent section (1115).

9. The valve plate electric locking mechanism according to claim 8 wherein the shell (14) comprises a shell body (141) and a shell cover (142), and the elastic return mechanism (13) comprises a stem (131), a backing plate (132), a return spring (133) and an adjusting terminal (134); one end of the stem (131) is screwed into the backing plate (132), while the other end is screwed through the adjusting terminal (134) after passing through the base rod part (111), the return spring (133) and the shell body (141) successively; the return spring (133) has an elastic tendency of elongation, and one end of the return spring (133) clamps the lock rod (11) together with the backing plate (132) and the other end clamps the shell body (141) together with the adjusting terminal (134), and a top opening of the shell body (141) is closed by the shell cover (142).

10. The valve plate electric locking mechanism according to claim 9, wherein the base rod part (111) and the shell body (141) are respectively provided with a rod bump (1114) and a body bump (1411) which can jointly support the backing plate (132) from both sides.

11. The valve plate electric locking mechanism according to claim 1, wherein the sharp corner is composed of intersecting cone inclined surfaces (1221) and cone cambered surfaces (1222).

12. The valve plate electric locking mechanism according to claim 11 wherein the shell (14) comprises a shell body (141) and a shell cover (142), and the elastic return mechanism (13) comprises a stem (131), a backing plate (132), a return spring (133) and an adjusting terminal (134); one end of the stem (131) is screwed into the backing plate (132), while the other end is screwed through the adjusting terminal (134) after passing through the base rod part (111), the return spring (133) and the shell body (141) successively; the return spring (133) has an elastic tendency of elongation, and one end of the return spring (133) clamps the lock rod (11) together with the backing plate (132) and the other end clamps the shell body (141) together with the adjusting terminal (134), and a top opening of the shell body (141) is closed by the shell cover (142).

13. The valve plate electric locking mechanism according to claim 1, wherein a cone pin (1223) with a cone screw hole (1224) is arranged on the pyramid (122), and a seat socket (1211) for inserting the cone pin (1223) and a seat long groove (1212) penetrating the top surface and the seat socket (1211); the cone screw hole (1224) is able to move along the seat long groove (1212) during a process in which the cone pin (1223) is inserted or pulled out of the seat socket (1211), an inner wall of the seat socket (1211) is provided with a plurality of seat guide grooves (1213), and a plurality of cone ribs (1225) respectively corresponding to the seat guide grooves (1213) one by one are respectively arranged on the cone pin (1223).

14. The valve plate electric locking mechanism according to claim 13 wherein the shell (14) comprises a shell body (141) and a shell cover (142), and the elastic return mechanism (13) comprises a stem (131), a backing plate (132), a return spring (133) and an adjusting terminal (134); one end of the stem (131) is screwed into the backing plate (132), while the other end is screwed through the adjusting terminal (134) after passing through the base rod part (111), the return spring (133) and the shell body (141) successively; the return spring (133) has an elastic tendency of elongation, and one end of the return spring (133) clamps the lock rod (11) together with the backing plate (132) and the other end clamps the shell body (141) together with the adjusting terminal (134), and a top opening of the shell body (141) is closed by the shell cover (142).

15. The valve plate electric locking mechanism according to claim 1 wherein the shell (14) comprises a shell body (141) and a shell cover (142), and the elastic return mechanism (13) comprises a stem (131), a backing plate (132), a return spring (133) and an adjusting terminal (134); one end of the stem (131) is screwed into the backing plate (132), while the other end is screwed through the adjusting terminal (134) after passing through the base rod part (111), the return spring (133) and the shell body (141) successively; the return spring (133) has an elastic tendency of elongation, and one end of the return spring (133) clamps the lock rod (11) together with the backing plate (132) and the other end clamps the shell body (141) together with the adjusting terminal (134), and a top opening of the shell body (141) is closed by the shell cover (142).

16. The valve plate electric locking mechanism according to claim 15, wherein the base rod part (111) and the shell body (141) are respectively provided with a rod bump (1114) and a body bump (1411) which can jointly support the backing plate (132) from both sides.

17. The valve plate electric locking mechanism according to claim 15, wherein the base rod part (111) and the shell body (141) are respectively provided with a rod bump (1114) and a body bump (1411) which can jointly support the backing plate (132) from both sides.

18. The valve plate electric locking mechanism according to claim 15, wherein the elastic return mechanism (13) further comprises an anti-rotation terminal (135), which is in threaded connection with the stem (131) and located at a side of the adjusting terminal (134) far away from the return spring (133); adjacent surfaces of the adjusting terminal (134) and the anti-rotation terminal (135) are respectively provided with adjusting teeth (1341) and rotation-stopping teeth (1351), and the adjusting teeth (1341) and the rotation-stopping teeth (1351) can be meshed with each other to restrict the adjusting terminal (134) or the anti-rotation terminal (135) from being screwed out of the stem (131) independently.

19. The valve plate electric locking mechanism according to claim 1, wherein the shell (14) comprises a shell body (141) and a shell cover (142), and the elastic return mechanism (13) comprises a stem (131), a backing plate (132), a return spring (133) and an adjusting terminal (134); one end of the stem (131) is screwed into the backing plate (132), while the other end is screwed through the adjusting terminal (134) after passing through the base rod part (111), the return spring (133) and the shell body (141) successively; the return spring (133) has an elastic tendency of elongation, and one end of the return spring (133) clamps the lock rod (11) together with the backing plate (132) and the other end clamps the shell body (141) together with the adjusting terminal (134), and a top opening of the shell body (141) is closed by the shell cover (142).

* * * * *